US008442944B2

(12) United States Patent
Prahlad et al.

(10) Patent No.: US 8,442,944 B2
(45) Date of Patent: *May 14, 2013

(54) SYSTEM AND METHOD FOR GENERATING AND MANAGING QUICK RECOVERY VOLUMES

(75) Inventors: Anand Prahlad, East Brunswick, NJ (US); Andreas May, Marlboro, NJ (US); Ivan Pittaluga, Kirkland, WA (US); John Alexander, Bellevue, WA (US); Jeremy A. Schwartz, Red Bank, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,763

(22) Filed: Sep. 30, 2011

(65) Prior Publication Data
US 2012/0089798 A1   Apr. 12, 2012

Related U.S. Application Data

(63) Continuation of application No. 12/017,923, filed on Jan. 22, 2008, now Pat. No. 8,055,625, which is a continuation of application No. 10/262,556, filed on Sep. 30, 2002, now Pat. No. 7,346,623.

(60) Provisional application No. 60/326,021, filed on Sep. 28, 2001.

(51) Int. Cl.
*G06F 17/00* (2006.01)

(52) U.S. Cl.
USPC ............ 707/639; 707/640; 707/645; 707/649

(58) Field of Classification Search .................. 707/639, 707/640, 645, 649
See application file for complete search history.

(56) References Cited

U.S. PATENT DOCUMENTS 4,686,620 A   8/1987   Ng
4,995,035 A   2/1991   Cole et al.

(Continued)

FOREIGN PATENT DOCUMENTS

EP   0259912 A1   3/1988
EP   0405926 A2   1/1991

(Continued)

OTHER PUBLICATIONS

U.S. Appl. No. 13/076,765, filed Mar. 31, 2011, Bansod.

(Continued)

*Primary Examiner* — Sana Al Hashemi
(74) *Attorney, Agent, or Firm* — Perkins Coie LLP

(57) ABSTRACT

The invention relates to computer readable medium storing program code which when executed on a computer causes the computer to perform a method for creating a quick recovery volume of a primary data set used by a first computer in a backup storage system, which includes identifying a snapshot image of the primary data set generated by a snapshot application, creating the quick recovery volume of the primary data set from the snapshot image of the primary data set and controlling transfer of data from the first computer to an archival storage unit. In one embodiment, the invention provides a method for creating a quick recovery volume of a primary data set that includes creating a snapshot image of the primary data set and creating a quick recovery volume of the primary data set from the snapshot image of the primary data set.

20 Claims, 7 Drawing Sheets

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,604,862 A | 2/1997 | Midgely et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,878,408 A | 3/1999 | Van Huben et al. |
| 5,887,134 A | 3/1999 | Ebrahim |
| 5,901,327 A | 5/1999 | Ofek |
| 5,907,672 A | 5/1999 | Matze et al. |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,021,475 A | 2/2000 | Nguyen et al. |
| 6,026,414 A | 2/2000 | Anglin |
| 6,052,735 A | 4/2000 | Ulrich et al. |
| 6,072,490 A | 6/2000 | Bates et al. |
| 6,076,148 A | 6/2000 | Kedem |
| 6,094,416 A | 7/2000 | Ying |
| 6,131,095 A | 10/2000 | Low et al. |
| 6,131,148 A | 10/2000 | West et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,195,695 B1 | 2/2001 | Cheston et al. |
| 6,205,450 B1 | 3/2001 | Kanome |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,904 B1 | 2/2002 | Bartmann et al. |
| RE37,601 E | 3/2002 | Eastridge et al. |
| 6,356,801 B1 | 3/2002 | Goodman et al. |
| 6,366,986 B1 | 4/2002 | St. Pierre et al. |
| 6,366,988 B1 | 4/2002 | Skiba et al. |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,604,118 B2 | 8/2003 | Kleiman et al. |
| 6,631,477 B1 | 10/2003 | LeCrone et al. |
| 6,643,671 B2 | 11/2003 | Milillo et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 * | 12/2003 | Satyanarayanan et al. ............ 1/1 |
| 6,665,815 B1 | 12/2003 | Goldstein et al. |
| 6,721,767 B2 | 4/2004 | De Meno et al. |
| 6,728,736 B2 | 4/2004 | Hostetter et al. |
| 6,732,125 B1 | 5/2004 | Autrey et al. |
| 6,760,723 B2 | 7/2004 | Oshinsky et al. |
| 6,792,518 B2 | 9/2004 | Armangau et al. |
| 6,799,258 B1 | 9/2004 | Linde |
| 6,826,661 B2 | 11/2004 | Umbehocker et al. |
| 6,832,299 B2 | 12/2004 | Shimada et al. |
| 6,871,271 B2 | 3/2005 | Ohran et al. |
| 6,880,051 B2 | 4/2005 | Timpanaro-Perrotta |
| 6,898,688 B2 | 5/2005 | Martin et al. |
| 6,912,627 B2 | 6/2005 | Matsunami et al. |
| 6,915,313 B2 | 7/2005 | Yao |
| 6,938,135 B1 | 8/2005 | Kekre et al. |
| 6,948,038 B2 | 9/2005 | Berkowitz et al. |
| 6,948,089 B2 | 9/2005 | Fujibayashi |
| 6,954,834 B2 | 10/2005 | Slater et al. |
| 6,981,114 B1 | 12/2005 | Wu et al. |
| 6,981,177 B2 | 12/2005 | Beattie |
| 6,993,539 B2 | 1/2006 | Federwisch et al. |
| 7,003,641 B2 | 2/2006 | Prahlad et al. |
| 7,035,880 B1 | 4/2006 | Crescenti et al. |
| 7,080,088 B1 | 7/2006 | Lau |
| 7,165,079 B1 | 1/2007 | Chen et al. |
| 7,174,352 B2 | 2/2007 | Kleiman et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,240,219 B2 | 7/2007 | Teicher et al. |
| 7,275,177 B2 | 9/2007 | Armangau et al. |
| 7,296,125 B2 | 11/2007 | Ohran |
| 7,346,623 B2 | 3/2008 | Prahlad et al. |
| 7,383,538 B2 | 6/2008 | Bates et al. |
| 7,395,282 B1 | 7/2008 | Crescenti et al. |
| 7,406,048 B2 | 7/2008 | Datta et al. |
| 7,412,583 B2 | 8/2008 | Burton et al. |
| 7,480,779 B2 | 1/2009 | Tsuji |
| 7,509,316 B2 | 3/2009 | Greenblatt et al. |
| 7,529,782 B2 | 5/2009 | Prahlad et al. |
| 7,539,707 B2 | 5/2009 | Prahlad et al. |
| 7,539,735 B2 | 5/2009 | Fruchtman et al. |
| 7,549,028 B2 | 6/2009 | Thompson et al. |
| 7,567,991 B2 | 7/2009 | Armangau et al. |
| 7,568,080 B2 | 7/2009 | Prahlad et al. |
| 7,580,950 B2 | 8/2009 | Kavuri et al. |
| 7,620,666 B1 | 11/2009 | Root et al. |
| 7,651,593 B2 | 1/2010 | Prahlad et al. |
| 7,668,884 B2 | 2/2010 | Prahlad et al. |

| | | | |
|---|---|---|---|
| 7,716,183 B2 | 5/2010 | Lee | |
| 7,725,440 B2 | 5/2010 | Reed et al. | |
| 7,734,578 B2 | 6/2010 | Prahlad et al. | |
| 7,840,533 B2 | 11/2010 | Prahlad et al. | |
| 7,840,537 B2 | 11/2010 | Gokhale et al. | |
| 7,844,577 B2 | 11/2010 | Becker et al. | |
| 7,873,806 B2 | 1/2011 | Prahlad et al. | |
| 7,882,077 B2 | 2/2011 | Gokhale et al. | |
| 7,979,389 B2 | 7/2011 | Prahlad et al. | |
| 8,055,625 B2 | 11/2011 | Prahlad et al. | |
| 2002/0107877 A1 | 8/2002 | Whiting et al. | |
| 2003/0028514 A1 | 2/2003 | Lord et al. | |
| 2003/0028736 A1* | 2/2003 | Berkowitz et al. | 711/162 |
| 2003/0033346 A1 | 2/2003 | Carlson et al. | |
| 2003/0167380 A1 | 9/2003 | Green et al. | |
| 2003/0177149 A1 | 9/2003 | Coombs | |
| 2004/0139125 A1 | 7/2004 | Strassburg et al. | |
| 2004/0170374 A1 | 9/2004 | Bender et al. | |
| 2004/0230566 A1 | 11/2004 | Balijepalli et al. | |
| 2004/0260678 A1 | 12/2004 | Verbowski et al. | |
| 2005/0203864 A1 | 9/2005 | Schmidt et al. | |
| 2006/0224846 A1 | 10/2006 | Amarendran et al. | |
| 2007/0185940 A1 | 8/2007 | Prahlad et al. | |
| 2008/0028009 A1 | 1/2008 | Ngo | |
| 2008/0228771 A1 | 9/2008 | Prahlad et al. | |
| 2008/0229037 A1 | 9/2008 | Bunte et al. | |
| 2008/0294605 A1 | 11/2008 | Prahlad et al. | |
| 2009/0182963 A1 | 7/2009 | Prahlad et al. | |
| 2009/0319534 A1 | 12/2009 | Gokhale | |
| 2009/0319585 A1 | 12/2009 | Gokhale | |
| 2010/0070474 A1 | 3/2010 | Lad | |
| 2010/0070725 A1 | 3/2010 | Prahlad et al. | |
| 2010/0070726 A1 | 3/2010 | Ngo et al. | |
| 2010/0082672 A1 | 4/2010 | Kottomtharayil et al. | |
| 2010/0250549 A1 | 9/2010 | Muller et al. | |
| 2010/0299490 A1 | 11/2010 | Attarde et al. | |
| 2011/0131187 A1 | 6/2011 | Prahlad et al. | |
| 2011/0161295 A1 | 6/2011 | Ngo | |
| 2011/0161299 A1 | 6/2011 | Prahlad et al. | |
| 2011/0264620 A1 | 10/2011 | Prahlad et al. | |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0838758 | 4/1998 |
| EP | 0899662 A1 | 3/1999 |
| EP | 0981090 A1 | 2/2000 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000347811 | 12/2000 |
| WO | WO-9303549 | 2/1993 |
| WO | WO-9513580 A1 | 5/1995 |
| WO | WO-9912098 | 3/1999 |
| WO | WO-0104755 A1 | 1/2001 |
| WO | WO-02-088943 | 11/2002 |
| WO | WO-03028183 | 4/2003 |
| WO | WO-03046768 A1 | 6/2003 |
| WO | WO-2004034197 | 4/2004 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

CommVault Systems, Inc., "CommVault Galaxy Express 7.0 Backup & Recovery," copyright date 1999-2007, 4 pages.

CommVault Systems, Inc., "CommVault QiNetix: Architecture Overview," CommVault Systems White Paper, 2005, 35 pages.

CommVault Systems, Inc., "CommVault Simpana Software with SnapBackup," copyright date 1999-2009, 6 pages.

Commvault, "Remote Backup," <http://documentation.commvault.com/commvault/release_8_0_0/books_online_1_1/english_us/features/ddr/ddr.htm>, internet accessed on Dec. 17, 2009, 8 pages.

CommVault, "Snap Backup," <http://documentation.commvault.com/commvault/release_8_0_0/books_online_1/english_us/features/snap_backup/snap_backup.htm>, internet accessed on Dec. 17, 2009, 7 pages.

CommVault, "Snapshots," <http://documentation.commvault.com/commvault/release_8_0_0/books_online_1/english_us/features/snapshots/snapshots.htm>, internet accessed on Dec. 15, 2009, 2 pages.

CommVault, "Volume Shadow Services (VSS)," <http://documentation.commvault.com/commvault/release_8_0_0/books_online_1/english_us//features/snapshots/vss/vss.htm>, internet accessed on Dec. 23, 2009, 1 page.

Eitel, "Backup and Storage Management in Distributed Heterogeneous Environments," *IEEE*, 1994, pp. 124-126.

EMC Corporation, "EMC CLARiiON CX Series," May 2006, 7 pages.

EMC Corporation, "EMC CLARiiON CX3 UltraScale Series," Feb. 2008, 6 pages.

EMC Corporation, "EMC Symmetrix DMX Series," Jan. 2008, 8 pages.

Garimella, N., "Understanding and Exploiting Snapshot Technology for Data Protection, Part 1: Snapshot Technology Overview," <http://www.ibm.com/developerworks/tivoli/library/t-snaptsm1/index.html>internet accessed on Dec. 22, 2009, 8 pages.

Hitachi Data Systems, "Hitachi HiCommand Protection Manager Software," Feb. 2007, 2 pages.

International Search Report and Written Opinion for International Application No. PCT/US09/57102, Mail Date Nov. 6, 2009, 14 pages.

International Search Report and Written Opinion for International Application No. PCT/US10/62146, Mail Date Feb. 18, 2011, 9 pages.

International Search Report and Written Opinion for International Application No. PCT/US10/62158; Mail Date Feb. 23, 2011, 8 pages.

International Search Report and Written Opinion for International Application No. PCT/US2004/038323, date of mailing Feb. 19, 2008, 10 pages.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988).

Marshall, David, "Veeam's SureBackup transforms VMware image backups," <http://www.infoworld.com/print/117315>, internet accessed on Mar. 23, 2010, 4 pages.

Microsoft TechNet, "How volume Shadow Copy Service Works," <http://technet.microsoft.com/en-us/library/cc785914(WS.10,printer).aspx>, internet accessed on Dec. 17, 2009, 6 pages.

Microsoft TechNet, "Overview of Exchange Server Backup Methods," <http://technet.microsoft.com/en-us/library/aa996125(EXCHG.65,printer).aspx>, internet accessed on Dec. 29, 2009, 3 pages.

Microsoft TechNet, "What is Volume Shadow Copy Service?" Mar. 28, 2003, 5 pages.

Microsoft, "Microsoft System Center Data Protection Manager 2007: Microsoft Exchange Server," undated, 4 pages.

Microsoft, "Microsoft System Center Data Protection Manager 2007: Microsoft SharePoint Products and Technologies," undated, 4 pages.

Microsoft, "Microsoft System Center Data Protection Manager 2007: Product Overview," undated, 2 pages.

Microsoft.com, "XADM: Hot Split Snapshot Backups of Exchange," <http://support.microsoft.com/kb/311898/>, internet accessed on Dec. 29, 2009, 5 pages.

MSDN, "Backup Sequence Diagram," <http://msdn.microsoft.com/en-us/library/ms986539(EXCHG.65,printer).aspx>, internet accessed on Dec. 30, 2009, 1 page.

MSDN, "Exchange Transaction Logs and Checkpoint Files," <http://msdn.microsoft.com/en-us/library/ms986143(EXCHG.65,printer).aspx>, internet accessed on Dec. 30, 2009, 1 page.

MSDN, "Identifying Required Transaction Logs," <http://msdn.microsoft.com/en-us/library/ms986606(EXCHG.65,printer).aspx>, internet accessed on Dec. 30, 2009, 1 page.

MSDN, "Overview of Processing a Backup Under VSS," <http://msdn.microsoft.com/en-us/library/aa384589(VS.85,printer).aspx>, internet accessed on Dec. 18, 2009, 3 pages.

MSExchange.org, "Exchange log disk is full, Prevention and Remedies," <http://www.msexchange.org/articles/exchange-log-disk-full.html?printversion>, internet accessed on Dec. 30, 2009, 7 pages.

NetApp, "NetApp SnapManager for Microsoft Exchange," 2009, 2 pages.

Network Appliance, Inc., "Network Appliance Snapshot Technology," copyright 2004, 1 page.

OpenAir.com, Product Update—Jun. 21, 2001, http://web.archive.org/web/20011007153900 1http:llwww.openair.comlhomeln.s-ub.--p.sub.-- update062101 .html, Oct. 2001, 3 pages.

Rosenblum et al., "The Design and Implementation of a Log-Structured File System," *Operating Systems Review SIGOPS*, vol. 25, No. 5, New York, US, pp. 1-15 (May 1991).

Veeam Software, "The New Standard for Data Protection," internet accessed on Mar. 23, 2010, 2 pages.

Veritas Software Corporation, "Veritas Volume Manager 3.2, Administrator's Guide," Aug. 2001, 360 pages.

Wikipedia.org, "Snapshot (computer storage)," <http://en.wikipedia.org/w/index.php?title=Snapshot_(computer_storage)>, internet accessed on Dec. 15, 2009, 3 pages.

* cited by examiner

SYSTEM AND METHOD FOR GENERATING AND MANAGING QUICK RECOVERY VOLUMES

CROSS-REFERENCE TO RELATED APPLICATION(S)

This application is a continuation of U.S. patent application Ser. No. 12/017,923, filed Jan. 22, 2008 now U.S. Pat. No. 8,055,625, entitled "SYSTEM AND METHOD FOR GENERATING AND MANAGING QUICK RECOVERY VOLUMES," which is a continuation of U.S. patent application Ser. No. 10/262,556, filed Sep. 30, 2002, entitled "SYSTEM AND METHOD FOR GENERATING AND MANAGING QUICK RECOVERY VOLUMES," now U.S. Pat. No. 7,346,623, which claims priority from U.S. Provisional Application No. 60/326,021, entitled "METHOD FOR MANAGING SNAPSHOTS GENERATED BY AN OPERATING SYSTEM OR OTHER APPLICATION", filed Sep. 28, 2001. The entire contents of each of the foregoing applications is incorporated herein by reference.

This application is related to the following pending applications: application Ser. No. 09/610,738, titled MODULAR BACKUP AND RETRIEVAL SYSTEM USED IN CONJUNCTION WITH A STORAGE AREA NETWORK, filed Jul. 6, 2000; application Ser. No. 09/609,977, titled MODULAR BACKUP AND RETRIEVAL SYSTEM WITH AN INTEGRATED STORAGE AREA FILING SYSTEM, filed Aug. 5, 2000; application Ser. No. 09/354,058, titled HIERARCHICAL BACKUP AND RETRIEVAL SYSTEM, filed Jul. 15, 1999; application Ser. No. 09/774,302, titled LOGICAL VIEW WITH GRANULAR ACCESS TO EXCHANGE DATA MANAGED BY A MODULAR DATA AND STORAGE MANAGEMENT SYSTEM, filed Jan. 30, 2001; application Ser. No. 09/876,289, titled APPLICATION SPECIFIC ROLLBACK IN A COMPUTER SYSTEM, filed Jun. 6, 2000; and application Ser. No. 09/038,440, titled PIPELINED HIGH SPEED DATA TRANSFER MECHANISM, filed Mar. 11, 1998; each of which applications is hereby incorporated herein by reference in this application.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The invention disclosed herein relates generally to backup storage systems and methods for computer data. More particularly, the present invention relates to managing shadow copies of a volume.

The server operating system by Microsoft Corp. of Redmond, Wash. called XP/.NET Server contains an integrated application for making shadow copies. Such shadow copies are also known as "snapshots" and can either be hardware or software copies depending on the snapshot program being used. Common snapshot programs include the previously-mentioned XP/.NET Server snapshot program by Microsoft, the TimeFinder snapshot program by EMC Corp. of Hopkinton, Mass., and the EVM snapshot program by Compaq Computer Corp. of Houston, Tex.

Generally, when a shadow copy is taken, a new logical volume is exposed on the machine that is an exact image of the original volume. While changes can continue to occur on the original volume, the new volume is a static, point-in-time view of the data. Since shadow copies persist on a user's workstation, a different network machine, etc. the shadow copies provide the ability to have multiple versions of data ready for recovery at a moment's notice. Minimal restore time, and the downtime associated therewith while the restore operation is being performed, is therefore provided since there is no need to mount external media, such as tape or optical media, to stream data back therefrom.

Although shadow copying offers quick backup and recovery capability, the snapshots are stored on relatively expensive media, such as a fast hard drive, a redundant array of independent disks ("RAID") system. RAID refers to a set of two or more ordinary hard disks and a specialized disk controller. The RAID system copies data across multiple drives, so more than one disk is reading and writing simultaneously. Fault tolerance is achieved by mirroring, which duplicates the data on two drives, and parity, which calculates the data in two drives and stores the results on a third. A failed drive can be swapped with a new one, and the RAID controller rebuilds the lost data on the failed drive. Some backup storage systems copy backups to slower media, such as slow hard drives, tape drives, etc.; however, the downtime associated with a backup and recovery for such systems is increased. Moreover, backup copies are formatted or compressed for optimum utilization of storage media. Restoring backup copies further require the extra step of unformatting or uncompressing the backup copy for use by the computer system There is therefore a need for a backup storage system which minimizes the downtime associated with a backup and restore operation while taking advantage of less expensive media.

Additionally, the software products available to create shadow copies, such as the XP/.NET, TimeFinder, etc., lack efficient management of shadowed copies. For instance, administrators in many instances must track shadowed copies, remember which original volume corresponds to particular shadowed copies, what data existed on them, when a copy operation occurred, if a copy should be destroyed, etc. There is therefore a need for methods, systems, and software products that enable efficient management of shadowed copies.

SUMMARY

The present invention provides methods, systems, and software products that enable efficient creation, management, and recovery of shadowed copies and quick recovery volumes of primary volumes or applications. Particularly, the invention provides methods and systems for creating a quick recovery volume and snapshot images of primary volumes and application data from a single interface.

In one aspect of this invention, a computer readable medium which stores program code is provided that when executed on a computer, causes the computer to perform a method for creating a quick recovery volume of a primary data set used by a first computer in a backup storage system. In one embodiment, the method includes identifying a snapshot image of the primary data set generated by a snapshot application, and creating the quick recovery volume of the primary data set from the snapshot image of the primary data set. The method also including controlling transfer of data from the first computer to an archival storage unit. In one embodiment, the data set is a primary volume or application data. The quick recovery volume may also be a disk-to-disk data-block-level replication of the data set. The quick recovery volume may be an incremental backup of a previous quick recovery volume of the primary data set.

In one embodiment, the program code includes an agent module and a storage manager module. The agent module enables data transfer from the first computer to the archival storage unit and the storage agent module interfaces the agent module and the archival storage unit. The agent module may be an intelligent agent module, which enables data transfer of the primary data set for a specific application. The program code may further provide a quick recovery agent that evokes a snapshot application to create the snapshot image of the primary data set. The primary data set may include a plurality of primary volumes, at least one primary volume and at least one application data set, or a plurality of application data sets. The scope of the primary data set may be defined as a sub-client of the first computer. The details to create the quick volume may be provided in a quick recovery policy data structure.

In one embodiment, the program code causes the first computer to automatically select a destination volume for the quick recovery volume of the primary data set from a pool of available volumes. The destination volume for the quick recovery volume of the primary data set may be selected based on storage space available on an available volume in comparison to storage space needed for the quick recovery volume, the selected volume capacity exceeding that needed for the quick recovery volume of the primary data set and closer to a capacity needed than other available volumes.

In one aspect of this invention, a computer system is provided that includes an archival storage unit, and a programmed computer for controlling data transfer from the computer to the archival storage unit to create a quick recovery volume of a primary data set. The computer may provide a snapshot image of the primary data set, and create the quick recovery volume of the primary data set from the snapshot image for the primary data set. The archival storage unit may be connected to the client computer over a communication network. The computer system may also include at least one server computer communicatively coupled to the programmed computer and the archival storage unit. The server may be programmed for controlling data transfer from the computer to the archival storage unit.

In one aspect of this invention, a method for creating a quick recovery volume of a primary data set of a first computer, is provided that includes the steps of creating a snapshot image of the primary data set and creating the quick recovery volume of the primary data set from the snapshot image of the primary data set. The step of creating the quick recovery volume of the primary data may be creating the quick recovery volume as a disk-to-disk data-block-level replication of the primary data set. The quick recovery volume of the primary data set may also be an incremental backup of a previous quick recovery volume of the primary data set. The quick recovery volume may further be a block-level copy of the primary data set from the snapshot image of the primary data set.

In one embodiment, the method of creating a primary recovery volume includes the step of synchronizing with an operating system to flush all data of the primary data set to an archival storage unit during the creation of the snapshot image of the primary data set. Synchronizing may include suspending input to a disk containing the primary data set during the creation of the snapshot image of the primary data set. The method may further include resuming input to the disk containing the primary data set upon creation of the snapshot image of the primary data set. The steps of suspending and resuming may be accomplished automatically or manually with user-supplied command line commands during presnapshot and post-snapshot phases. In one embodiment, the snapshot images of the primary data set are also indexed. In one embodiment of the invention, the method further includes the step of deleting the snapshot image of the primary data set at a selected time. The selected time may be immediately after a copy phase or after a persistence period.

In one aspect of this invention, a computer readable medium storing programming code is provided. The programming when executed causes a computer to present a snapshot manager that interfaces with a backup storage system. The snapshot manager enables users to browse snapshot images and enables users to recover snapshot images stored in the backup storage system. The snapshot manager may interface with a volume snapshot service for creating a snapshot image. The stored program code may further include a snapshot requester program module that packages data for the snapshot image. The packaged data may be communicated to the volume snapshot service for creating the snapshot image.

In one embodiment the programming code includes a snapshot requester program module and a snapshot writer program module, which may be directed by the snapshot requester program module to package data for the snapshot image. The writer program module may package data for a specific application, which may then be communicated to the volume snapshot service for creating the snapshot image.

In one embodiment, the snapshot manager program module indexes snapshot images. The snapshot indexing enables copying, deleting, displaying, browsing, changing properties, or recovering snapshot images. The snapshots may be indexed in terms of objects native to particular applications.

The snapshot management tool may integrate with existing backup systems, such as the Galaxy™ backup system provided by CommVault Systems of Oceanport, N.J. and further described in application Ser. No. 09/610,738. The present invention leverages the indexing technology and 'point-in-time' browse and recovery capability of such systems to manage shadow copies. Alternatively, the snapshot management tool may act as a stand-alone management tool for basic snapshot management not requiring integration with existing backup systems, such as the CommVault Galaxy™ backup system and others.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
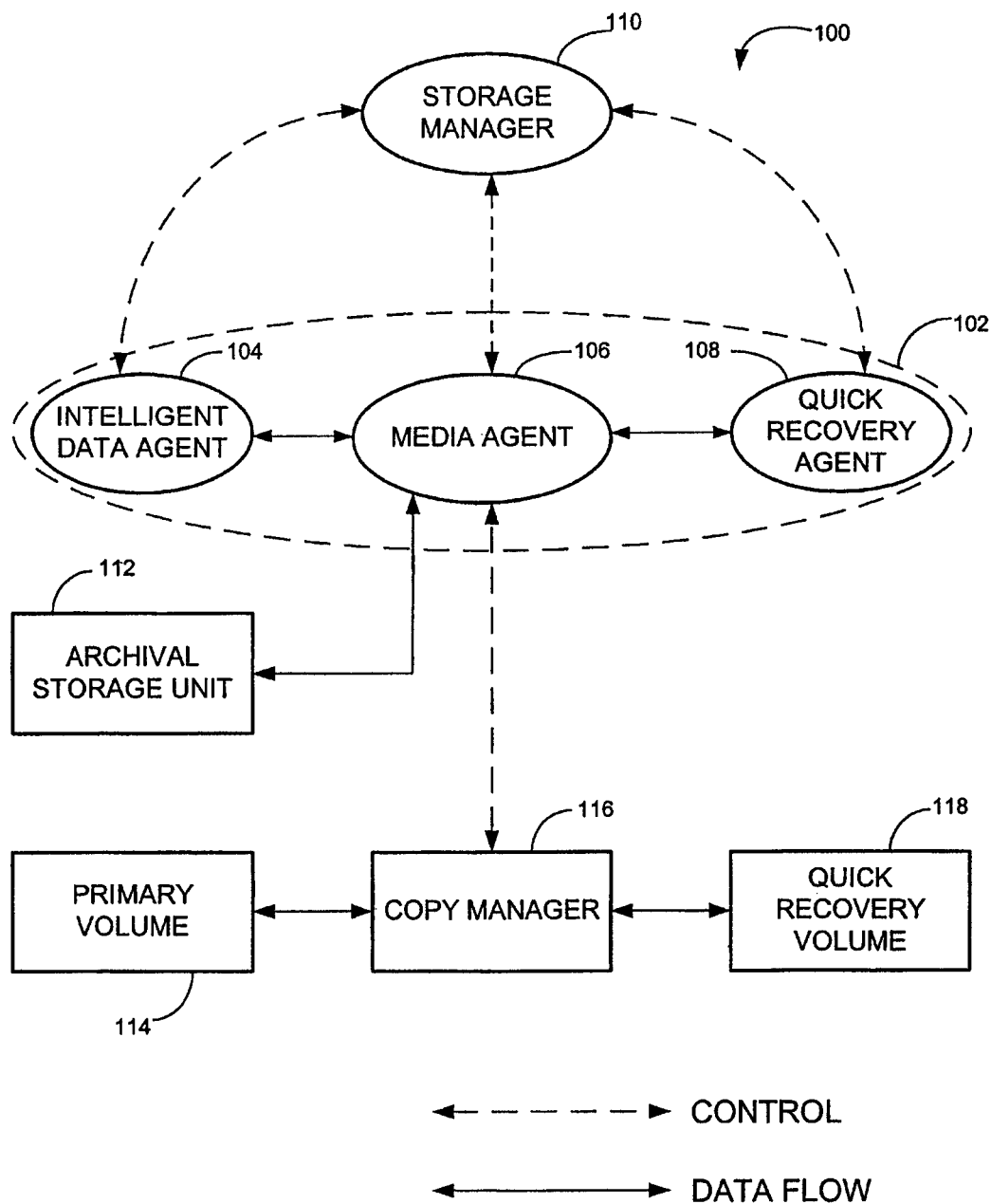
FIG. 1 is a block diagram depicting the software components and communication paths of program code stored on a computer readable medium for a backup storage system according to an embodiment of the invention.

Referring to FIG. 1, software components of a computer readable medium for use in creating quick recovery volumes of a primary data set of a client computer in a backup storage system 100, according to an embodiment of this invention, includes at least one agent 102, such as an intelligent data agent 104, e.g., the iDataAgent™ module available with the Galaxy™ system, a quick recovery agent 108, a media agent 106, e.g., the MediaAgent™ module available with the Galaxy™ system, etc., and at least one storage manager 110, e.g., the CommServe StorageManager™ module also available with the Galaxy™ system. A primary data set generally denotes a volume, application data, or other data being actively used by of a client computer. A volume is generally an area of storage on a data storage device, which may be the whole storage area or portions thereof. An agent 102 generally refers to a program module that provides control and data transfer functionality to client computers. A client generally refers to a computer with data, e.g., a primary data set, that may be backed up, such as a personal computer, workstation, mainframe computer, host, etc. Intelligent data agent 104 refers to an agent for a specific application, such as Windows 2000 File System, Microsoft Exchange 2000 Database, etc., that provide control and data transfer functionality for the data of the specific applications. A plurality of agents 102, such as intelligent data agents 104 or quick recovery agents 108, may be provided for and/or reside on each client computer, for example, where the client computer includes a plurality of applications and a file system or systems for which a quick recovery volume may be created.

A quick recovery volume as is used herein generally to denote a full replica of an original volume. A full replica implies an unaltered copy of the primary data set, such as an unformatted or uncompressed copy, as is typically the case with backup copies. This enables faster recovery for a client computer by simply mounting or pointing to the quick recovery volume.

In one embodiment, where a quick recovery volume is being created for one or more volumes and/or applications on a client computer, a sub-client may be created. A sub-client generally refers to a defined set of parameters and policies that define the scope of the data set, such as the volumes or applications that are going to be copied, recovered, or otherwise managed. A sub-client generally contains a subset of the volumes and applications of the client. Multiple sub-clients may be created for a client computer and the sub-clients may overlap such that they include common data sets between them. A quick recovery volume for a client, sub-client, or a plurality of sub-clients may be directed to point to a quick recovery policy or policies data structures, which provide the details for creating a quick recovery volume, such as how snapshots for the volumes or applications are created, copied, snapshot and quick recovery volume persistence, data pruning, the destination volume of the quick recovery volume, etc.

The destination volume for the quick recovery volume may be specified to be copied to specific volumes, or may be selected automatically from a pool of available volumes. The quick recovery agent 108 or the media agent 106, in one embodiment, selects an available volume as the destination volume where the quick recovery volume will be stored. The quick recovery agent 108 may select the volume at random or target a volume according to the storage space available on a particular volume in comparison to the space needed for the quick recovery volume. Once the volume is selected, it is removed from the pool of available volumes. This may be accomplished, for example, by the media agent 106 determining the capacity needed for a quick recovery volume, determining the capacity of the available volumes, and selecting the volume with a capacity exceeding that needed for the quick recovery volume and closer to the capacity needed than the other volumes.

A media agent 106 generally refers to a software module that provides control for archival storage units 112, such as tape library, a RAID system, etc., and facilitates local and remote data transfer to and from the archival storage units, or between the clients and the archival storage units. The media agent 106 may interface with one or more agents 102, such as the intelligent data agent 104 or quick recovery agent 108, to control the data being copied from a client computer, such as a primary volume or application data, to the storage volumes. A primary volume generally refers to a volume of a client computer that is the original source of the data, e.g. the primary data set, for the quick recovery volume. Data generally refers to information that may be stored on a storage device, including the file system, applications, and information related thereto. For example, the media agent 106 may interface with a quick recovery agent 108 to act as a copy manager 116, which manages the copying of data from primary volumes 114 to the quick recovery volumes 118. A storage manager 110 generally refers to a software module or application that interfaces the plurality of agents, clients, storage units, etc., and in one embodiment, coordinates and controls data flow between them. The primary volumes 114 and the quick recovery volume 118 may be stored via a variety of storage devices, such as tape drives, hard drives, optical drives, etc. The storage devices may be local to the client, such as local drives, or remote to the client, such as remote drives on a storage area network ("SAN") or local area network ("LAN") environment, etc.

A quick recovery agent 108 generally refers to a software module that provides the ability to create quick recovery volumes 118. The quick recovery agent 108 evokes a snapshot mechanism or interfaces with a snapshot manager that provides for the creation of a snapshot image of the primary data set, such as of a primary volume or of application data. In one embodiment, the snapshot image of the primary data set is accessed to create a quick recovery volume of the primary data set.

In one embodiment, the quick recovery agent 108 is a stand-alone application that adds to or interfaces with snapshot image programming, such as XP/.NET, TimeFinder, etc., that create snapshots or shadowed copies of the primary data set for the creation of the quick recovery volume 118 of the primary data set. Alternatively, or in addition, the quick recovery volume 118 is a disk-to-disk data-block-level volume or application data replication of a client computer.

In one embodiment, the snapshot images of the primary data set are stored on fast media, such as a fast hard drive or RAID system and the quick recovery volume is stored on slow media, such as a hard drive or a tape library. The client computer may be a stand-alone unit or connected to an archival storage unit in a storage area network ("SAN") or local area network ("LAN") environment.

In one embodiment, an initial quick recovery volume is created by capturing a snapshot image of the primary data set and creating the quick recovery volume from data stored on the primary volume. The quick recovery volume is subsequently updated to include changes to the primary data set by referencing changes appearing in subsequent snapshot images of the primary data set. This may be accomplished by tracking data changes between snapshot images. The snapshot images may include the changed data or simply track the data that has changed. The quick recovery volume may then be incrementally updated in accordance with the data changes or with reference to the tracked changes in the snapshot images.

In one embodiment, the quick recovery volume of the primary data set is an incremental backup. That is, the operation for creating or updating the quick recovery volume is performed by incrementally copying, from the primary volume or application data to a previous a snapshot image or images of the primary data set, blocks of data that have been modified since the pervious snapshot images. Alternatively, creating or updating a quick recovery volume is accomplished by incrementally copying data that has changed from a primary volume to the quick recovery volume with reference to changes tracked in the snapshot image. In one embodiment, a plurality of snapshot images of the primary date set are created and the data from the snapshots is incrementally stored between the snapshots to provide redundant quick recovery.

Figure 2:
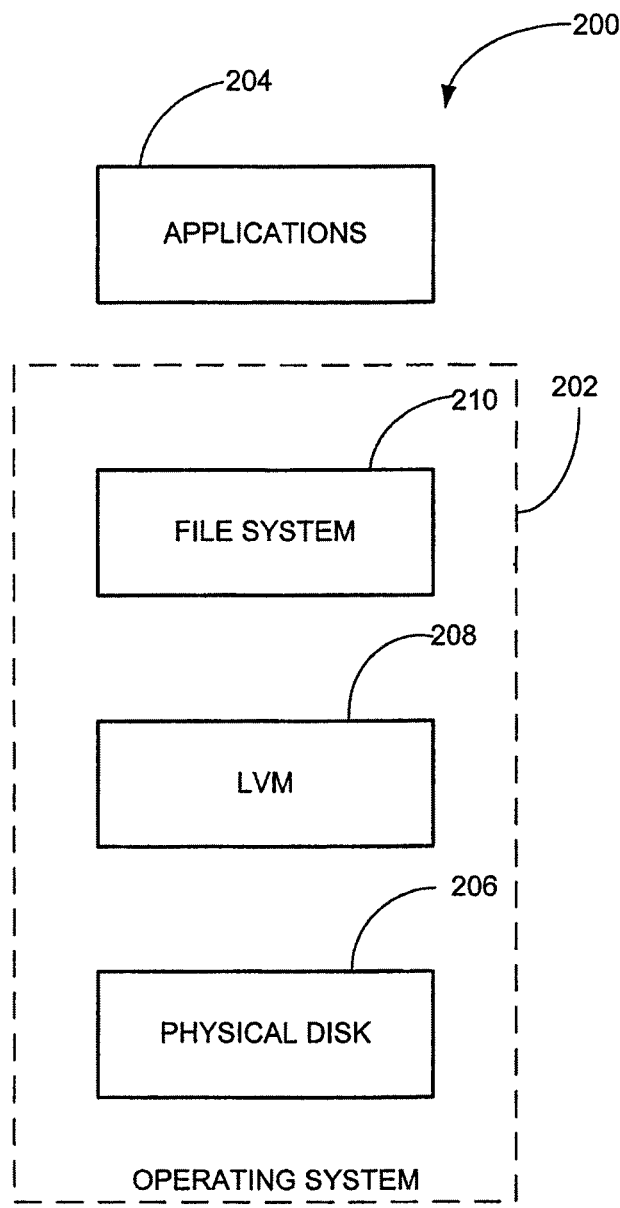
FIG. 2 is a block diagram of a typical storage system model.

Referring to FIG. 2, a typical storage system model 200 for a client computer includes a plurality of layers, such as an operating system layer 202, an applications layer 204, etc. The operating system layer further includes a plurality of layers or sub-layers, e.g., a physical disk layer 206, a logical volume manager ("LVM") layer 208, a file system layer 210, etc. The physical disk layer 206 denotes physical storage devices, such as a magnetic hard drive or disk array. The LVM layer 208 refers to logical disk volume management, which allows efficient and flexible use of the physical disk storage, for example, by permitting the physical disk to be divided into several partitions that may be used independently of each other. Some LVMs combine several physical disks into one virtual disk. LVMs may write metadata, such as partition tables, to reserved areas of the physical disk. The LVM virtual disks are transparently presented to upper layers of the system as block-addressable storage devices having the same characteristics as the underlying physical disks.

The file system layer 210 represents a higher-level logical view of the data, which typically consists of a hierarchy of nested directories, folders, and files, and metadata. The features and attributes of files may vary according to the particular file system in use. For example, an NTFS, i.e., a Windows NT file system, tracks ownership and per-user access rights on each file, whereas FAT, i.e., file allocation table, file systems do not provide security features. Above the file system, and outside the scope of the operating system in general, is the applications layer 204. The applications layer 204 includes application software, such as a word processor program, etc. which interface with the file system provided by the operating system to store data. Sophisticated software, such as database management systems ("DBMS"), may use special file system features even raw logical volumes, and employ measure to protect the consistency of data and metadata. The consistency of the data and metadata may be maintained during the creation of a quick recovery volume with writers particular to specific applications or file systems. Writers are described in more detail below.

Figure 3:
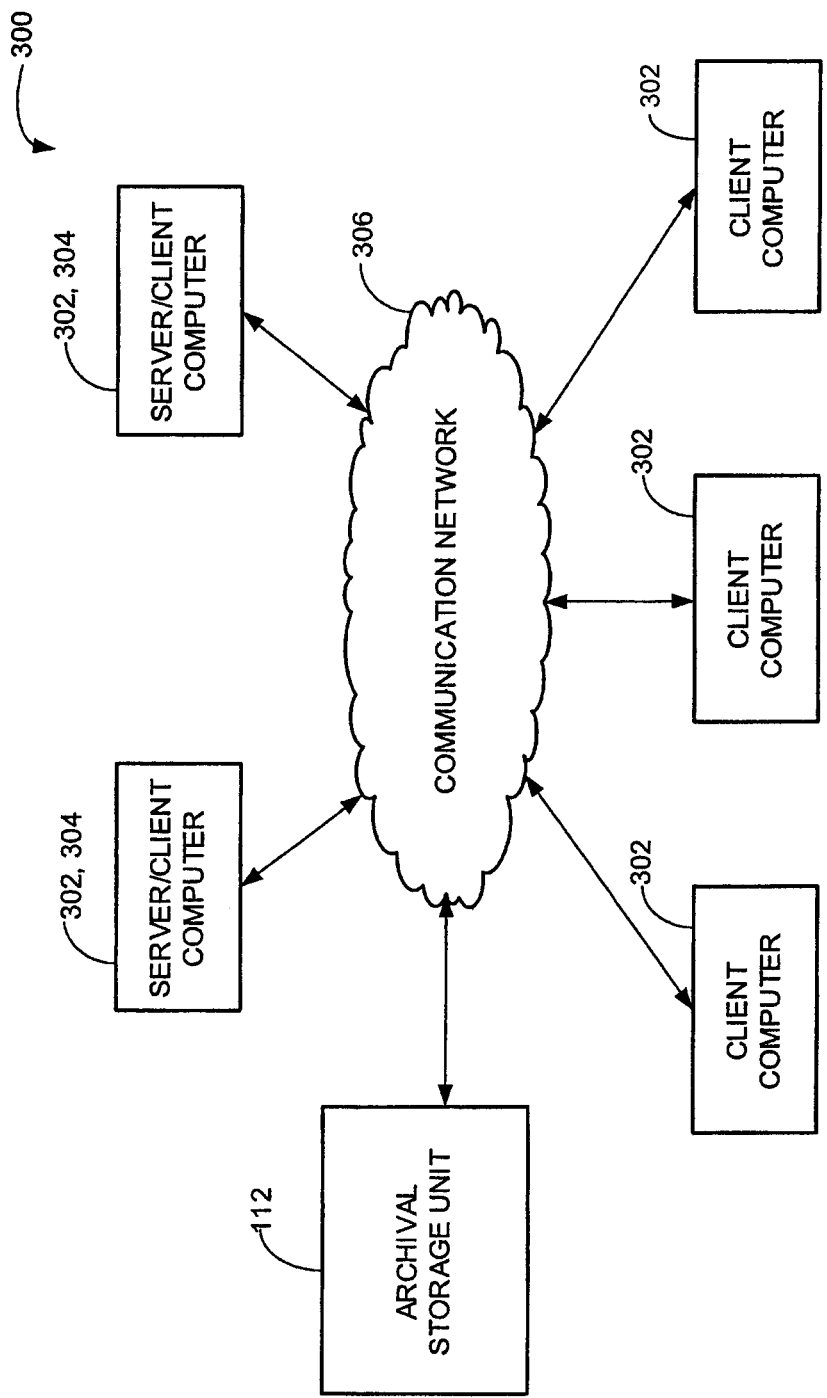
FIG. 3 is a computer system according to an embodiment of the invention.

Referring to FIG. 3 a computer system, according to one embodiment of the invention, includes a client computer 302, such as a personal computer, a workstation, a server computer, a host computer, etc. In one embodiment, the client computer 302 contains programming which enables the creation of local quick recovery volumes of a primary volume or of application data. That is, the client computer 302 deploying the programming creates a quick recovery volume or volumes that are stored or copied locally at the client computer, such as on a local hard drive, tape drive, optical drive, etc. In one embodiment, the programming is deployed on at least one client computer 302 connected over a communications network 304, such as a LAN or SAN, to at least one archival storage unit 112, such as a tape library, a stand alone drive 306, a RAID cabinet, etc. In one embodiment, the client computer 302 include programming, such as an agent 102 or a storage manager 110, that provides data transfer functionality from the client computer 302 to the archival storage unit 112. In one embodiment, at least one of the client computers 302 also acts as a server computer 304. The server computer 302 generally contains programming, such as a media agent 106 or a storage manager 110 to control data transfer between the client computers 302 and the archival storage units 112. In one embodiment, at least two client computers 302 act as server computers 304; at least one server providing media agent functionality and at least one server providing storage manager functionality.

Figure 4:
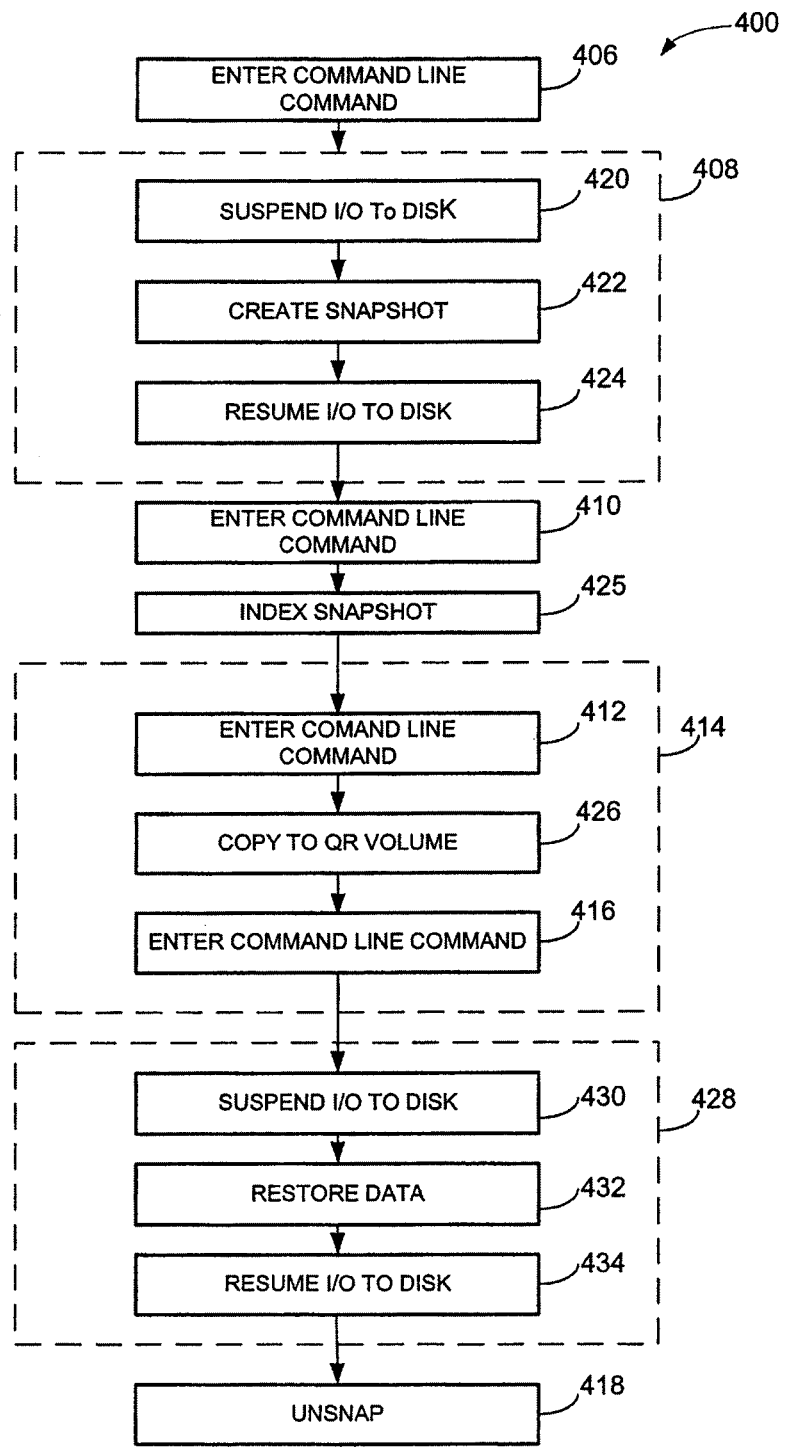
FIG. 4 is a flow diagram of a method of creating a backup copy of a primary data set of a client computer according to an embodiment of the invention.

Referring to FIG. 4, a method for creating a quick recovery volume of a primary data set of a client computer 400, according to one embodiment of this invention, is performed in a plurality of phases. In one embodiment, the quick recovery volume 118 is created in two phases, a snapshot phase 408 and a copy phase 414. Each of the snapshot and copy phases may include a plurality of accompanying phases. For instance, the snapshot phase 408 may include a presnapshot 406 and a post snapshot phase 410. Similarly, the copy phase 404 may include a pre-copy phase 412 and a post copy phase 416.

In the snapshot phase 402, the quick recovery agent 108 synchronizes with the applications, if any, and the operating system to ensure that all data of the primary data set to be backed up is flushed to the archival storage unit or destination disk, where the quick recovery volume of the primary data set will be stored, and to ensure that the primary disk where the primary data set, such as the primary volume or application data, is located is not modified during the creation of the snapshot image, step 422. This may be accomplished for instance by suspending input or output to the primary disk containing the primary data set, step 420, which will ensure that the file system and metadata remain unchanged during the copy operation. In one embodiment, the quick recovery agent evokes the snapshot mechanism to create a snapshot image of the primary data set. The snapshot mechanism or snapshot manager may be a software module, an external snapshot application, such as CommVault Software Snapshot, XP/.NET, TimeFinder, etc., or a combination thereof. Once the snapshot image of the primary data set is created, application access to primary disk may resume, step 424, and update data on the primary disk as necessary, while the copy operation for the quick recovery volume 118 is in progress or is pending. In one embodiment, once the snapshot image is made the snapshot image is indexed step 425. Indexing generally denotes associating information with a snapshot image that may be useful in managing snapshot image, such as the date the snapshot image was created, the lifespan of the snapshot, etc.

During the copy phase, the quick recovery volume is created from the snapshot image of the primary data set so that any suspension in the input or output to primary disk may be minimized. This may be accomplished by the media agent 106 referring or pointing the quick recovery agent 108 to the snapshot volume or copy as the source of the data for the quick recovery volume 118. The relevant agent or agents may then package the data from the snapshot volume or copy, communicate the packaged data to the media agent 106 or quick recovery agent 108, and the media agent 106 or quick recovery agent 108 may send the data to the quick recovery volume 118 for copy. Packaging generally denotes parsing data and logically addressing the data that is to be used to facilitate the creation of the quick recovery volume. For example, where a snapshot of the Microsoft Exchange application is to be created, the Exchange specific intelligent agent will parse the relevant data from the primary disk or disks containing the application data and logically address the parsed data to facilitate rebuilding the parsed data for the quick recovery volume. In one embodiment, the copy phase is performed after a specified amount of time has lapsed, such as a day, two days, etc., or at a specified time. In yet another embodiment, a plurality of snapshot images of the primary data set may be created at various times and the oldest snapshot image is copied to the quick recovery volume.

The method of creating quick recovery volumes 118 may differ for particular applications. For example, for the Microsoft Exchange 2000 application, prior to suspending input/output to the storage group associated with the application, the entire storage group is dismounted automatically during the snapshot phase 402 and remounted automatically when the snapshot is ready. For the SQL 2000 database, the database may be frozen automatically and released when the snapshot is ready. In one embodiment, suspend and resume functions for particular applications may be accomplished with user-supplied command line commands or script, which may be entered during the presnapshot phase 406 or postsnapshot phase 410. Command line commands or script may further be entered to perform any additional processing that may be required, such as steps to synchronize with an application not supported by the quick recovery agent, or where an alternate host backup is desired, a command to mount the given volume onto the alternate host can be specified.

In one embodiment, during the copy phase 414, the quick recovery agent 108 performs a block-level copy of the primary data set from the snapshot image to the destination disk or volume, step 426, which becomes the quick recovery volume 118. Command line commands or script may also be provided during a precopy phase 412 and a post-copy phase 416.

Users may recover data from a snapshot image or the quick recovery volume 118, step 428. In one embodiment, recovery generally entails suspending input or output to the disk containing the quick recovery volume of the primary data set where the data will be copied from, step 430, restoring the primary data set to the primary volume, step 432, and resuming input or output to the disk, step 434. Restoring the primary data set, such as application data, includes mounting a volume containing the snapshot image of the primary data set, such as the primary volume or application data, or mounting a quick recovery volume 118 of the primary data set in place of the primary volume, or replacing individual files, folder, objects, etc. to the primary volume from the quick recovery volume. In one embodiment, where a backup copy of the primary data set replaces a primary volume, input or output to disk is not suspended. In one embodiment, the method of creating a quick recovery volume 118 includes an unsnap phase 418, which generally entails deleting the snapshot image that was created during the snapshot phase 408. The snapshot may be deleted at a specified time, such as immediately after the creation of the quick recovery volume or after a persistence period, which period so that the resources may be available for future quick recovery volume creations.

Figure 5:
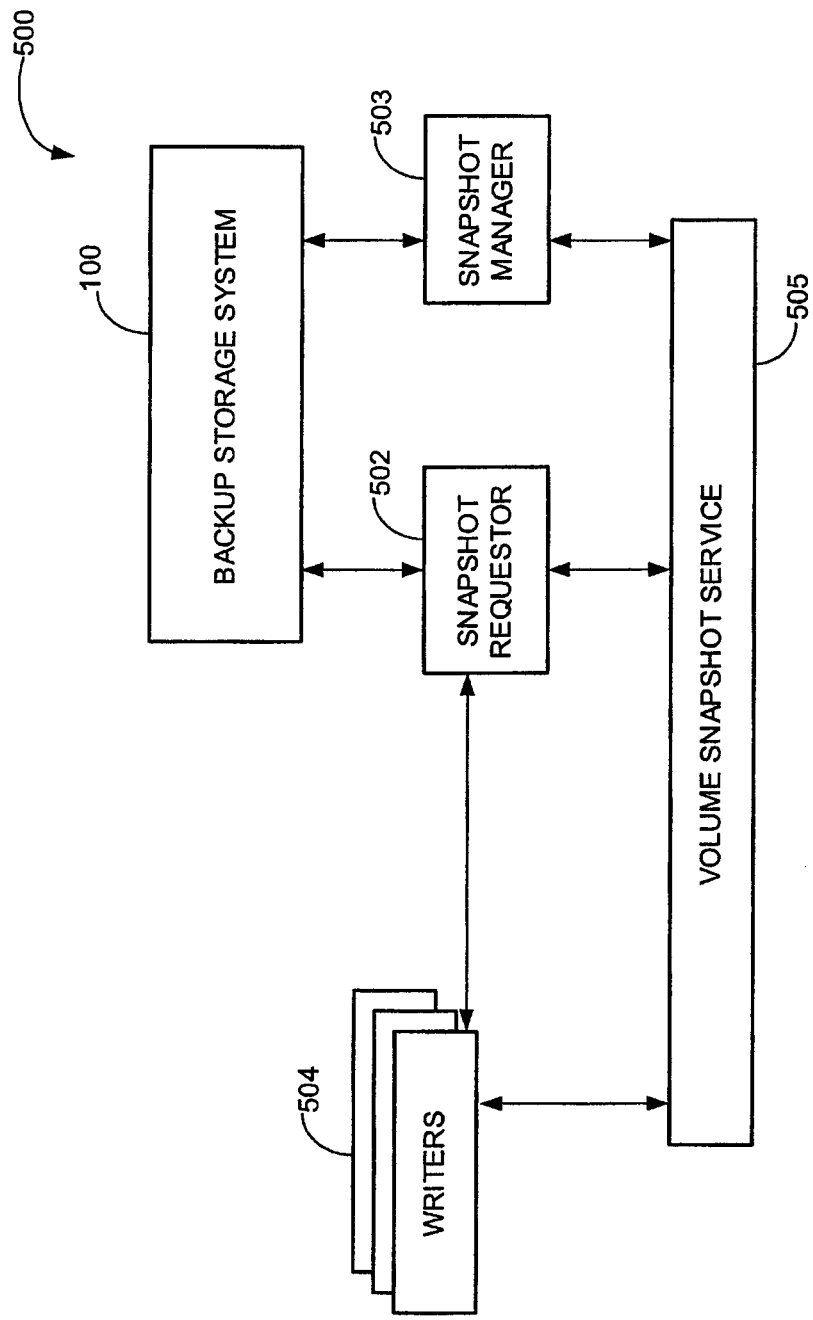
FIG. 5 is a block diagram depicting the software components and communication paths of program code stored on a computer readable medium for a backup storage system with snapshot capability according to an embodiment of the invention.

In one embodiment, backup software, such as the quick recovery agent 108 interfaces with a snapshot manager to access a snapshot image of the primary data set for the creation of a quick recovery volume 118. A snapshot manager may be a stand-alone application or program module that controls the creation and management of snapshot images of primary volumes or of application data. Referring to FIG. 5, a snapshot manager 503, according to one embodiment of this invention, is a program module, such as a snapshot manager agent, which interfaces with the backup programming, such as the quick recovery agent 108. The snapshot manager may be an intelligent agent in that it manages snapshot for a specific application, e.g., Windows 2000 File system, Exchange, Oracle, etc., a plurality of which can be installed on any client computer to create snapshot copies of a plurality of applications' data.

The creation and management of a snapshot image of the primary data set may be further accomplished with a snapshot requestor 502. In one embodiment, the snapshot requester 502 is a program module that generally packages data of particular applications or of primary volumes for. In one embodiment, when the creation of a snapshot image is requested by the quick recover agent 508, for example, the snapshot requestor 502 communicates with a snapshot writer 504 and directs the writers to package the data requested for the snapshot image. In one embodiment, snapshot writers 504 are application specific modules designed to package data from individual applications, such as Windows 2000 file system, Microsoft Exchange, Oracle, etc. After the snapshot writer 502 packages the data, the data is communicated to a volume snapshot service 505, which actually creates the snapshot image of the primary data set. In one embodiment, the snapshot writer 504 communicates the packaged data to the snapshot requester 502, which then passes the packaged data to the volume snapshot service 505.

The volume snapshot service 505 is either a software snapshot application from a software snapshot provider, such as Microsoft .NET Server, or a hardware snapshot application from a hardware snapshot provider, such as EMC or Compaq. The software snapshot image applications will, in one embodiment, create a space efficient copy that is exposed as a separate logical volume using a copy-on-write technique. Hardware snapshot image applications, typically accompanied with a RAID cabinet, create a mirror or clone copy of application data or primary volumes. Once the volume snapshot service 505 has taken the snapshot image, the snapshot data is passed to the snapshot manager 503, which indexes the snapshot image enabling snapshot management. Indexing generally denotes associating snapshots with information that may be useful in managing snapshots, such as the date the snapshot was created, the lifespan of the snapshot, etc. Managing generally includes, but is not limited to, copying, deleting, displaying, browsing, changing properties, or restoring the snapshots or data therein. Indexing generally provides point-in-time browse and management, such as recovery, capability of the snapshot images and of the quick recovery volumes. Users can choose to persist or retain snapshot images well beyond the lifetime of the requesting application or module. The snapshot manager 503 may then communicate the snapshot data to the quick recovery agent 108 for copying to the quick recovery volume 118, or to the media agent 106 for copying to the archival storage unit 112.

In one embodiment, the present invention implements a high-performance data mover for performing a disk-to-disk data transfer. Data mover may also perform server-less data transfer using extended copy to create secondary or auxiliary copies over the communication network, e.g., SAN or LAN. In one embodiment, an extended copy command acts as a copy manager, which is embedded on a SAN component, such as a gateway, router, tape library, etc. Alternatively, the copy manager is a program module that interfaces with the backup storage system. In another embodiment, hardware snapshots are mounted on an alternate host to perform a server-free backup. This effectively allows a user to convert a software snapshot image to the equivalent of a hardware snapshot image that can be persisted or retained.

In one embodiment, aware technology, described in U.S. patent application Ser. No. 09/610,738, is incorporated into snapshot image programming or volume snapshot services to make the applications aware. In other words, the intelligent data agent 104 makes objects that are native to particular applications part of the snapshot image, which enables the user to perform actions in terms of the applications' objects. This enables, for instance, browsing snapshot images of volumes consisting of Exchange data that will be visible in terms of storage groups and stores, rather than just a volume consisting of directories and files. For particular applications, such as Exchange or SQL Server, a further level of detail with regard to the objects may be included, such as paths to Exchange objects, such as Storage Groups or stores, or paths to SQL objects, such as databases, file-groups, or files. This information may be used at the time of browsing to determine if any of the existing snapshot volumes contain copies of the objects of interest so that they may be presented to the user for recovery. In other embodiments similar application-aware configurations are provided for applications such as Lotus Notes, Oracle, Sharepoint Server, etc.

In one embodiment, the snapshot manager 503 is accessible to a user with an appropriate user interface screen which enables the creation and management of snapshot images or quick recovery volumes of a primary volume or application data, contained on a client computer. Actions that are available to users include (1) create a snapshot image, e.g., snap, at a specified time (2) snap and persist for a period, (3) specify the destination volume of a snapshot image and where the image should persist (for software snapshot), (4) specify or change the period a snapshot image should persist, (5) browse existing snapshot images, (6) recover a snapshot image to a specified volume, and (7) destroy or delete a snapshot image. Browsing generally denotes enabling a user to view information for particular snapshots. For example, browsing enables a user to view the available snapshots for a particular volume or application data and information related thereto. Recovering generally refers to replacing the primary data set with data from a snapshot image or quick recovery volume, which includes mounting a volume containing the snapshot image or quick recovery in place of the primary volume, replacing application data on the primary disk from a snapshot or quick recovery volume, etc. In one embodiment, during a restoration, data may be retrieved from a plurality of quick recovery volumes, snapshot images, or a combination thereof. For example, data may be retrieved from a snapshot image and a quick recovery volume.

In one embodiment, a quick recovery volume or snapshot image of the primary data set may be used on a permanent basis as the primary data set, e.g., the primary volume. For example, a user may choose to run an application, such as Exchange, from the quick recovery volume permanently and future backup operations for the application will reflect the quick recovery volume as the primary volume. Setting up the backup operations as the replacement for the primary volume may be accomplished by identifying a quick recovery policy for the backup operation and the backup volumes available to the client, and releasing a volume from the pool of available volumes. This method of recovering a primary volume or application provides a faster method of recovering data since the data transfer from backup copies to the primary copy is effectively eliminated. Moreover, recovering from a quick recovery volume is a faster alternative that traditional backup techniques since the quick recovery volume does not have to be unformatted or uncompressed in order to the client computer to use the data. This method may be performed manually or automatically, and relevant tables or databases, such as the snapshot table may be amended to reflect the replacement volume as the primary volume or application for future backup operations.

In one embodiment, users may drill down to view particular folder, files, etc., or to view particular objects native to applications. In one embodiment, users are able to specify, with regard to a quick recovery copy, (1) whether the snapshot image should persist after the quick recovery volume, (2) if the image should persist, for how long, and (3) the location of the persistent storage for the image. In yet another embodiment, users are able to (1) request a snapshot image and a quick recovery volume, just a snapshot image, or just a quick recovery volume, (2) request a software snapshot image and optionally specify that it be converted to a hardware snapshot image, (3) request that the hardware snapshot image persist for a certain period of time, (4) recover data from a snapshot image at the volume level, e.g., the whole volume, or sub-volume level, e.g., individual folders, files, objects, etc., and (5) make another copy of a snapshot image on the SAN.

In one embodiment, snapshot information that has been indexed or associated with snapshot images by the snapshot manager 503, is tracked in at least one table or database, e.g., snapshot table, which is accessible to the backup storage system 100 or the storage manager 110. The snapshot table, in one embodiment, contains information for every volume or copy that has been configured for every client, application, or, sub-client, indicating the snapshot images that are currently available for a particular volume, application, sub-client, etc. The snapshot information preferably includes a timestamp that indicates when a snapshot was created and a time interval that indicates how long the snapshot should persist. The snapshot table may be accessed by any one of the program modules for managing and controlling the quick recovery volumes.

In one embodiment, an application or module, such as the snapshot manager, enables the following functionality. When a snapshot image of a volume or application is being performed, the application suspends input or output to a disk, determines which applications reside on the primary volume, engages the relevant writers for the particular applications, performs or directs a snapshot, packages the snapshot data, and resumes the input/output to the disk. The application also makes appropriate entries into the snapshot table for the given client.

When a backup is being performed, the application identifies the content, identifies the volumes involved, identifies the applications involved, engages all the writers involved, and performs or directs the snapshot, and performs or directs the copying to the quick recovery volume 118. Appropriate entries are made into the snapshot table for the given client and volumes involved. In some embodiments of the present invention, as part of the creation of a snapshot, the application enters into the snapshot table parameters relating to how long the snapshot should persist. When a snapshot is destroyed or deleted, the application performs or directs the deletion of the snapshot and updated the snapshot table accordingly.

If the snapshot is a software snap and persistent storage has been identified to convert it to a hardware snap, the application will first perform a fast copy of the data, such as with DataPipe and backup APIs, to accomplish the data movement, and then update the snapshot table. Every time the application is evoked, it re-discovers the volumes on the given client and ensures that any new volumes are added to the default sub-client of an agent, such as the snapshot manager intelligent agent. The application can also be called as part of a recovery operation. In which case a copy of the data is made from one volume to another. In addition, if operating system data, such as metadata, is involved, certain writers may have to be engaged to ensure a correct data restoration.

In one embodiment, pruning of data is also enabled, such as snapshot images that have expired or their persistence period lapsed. Pruning may be scheduled to run periodically, such as weekly, monthly, etc. If snapshot images are present and their persistence period has lapsed, the snapshot image is destroyed or deleted and the snapshot table is updated accordingly.

While the discussion above assumes that the application or module, such as the snapshot manager, encapsulates logic to manipulate the built-in shadow copy mechanism in Windows.NET Server, the application can easily encapsulate the same logic for any hardware snapshot which will be recognized by those skilled in the art. The application may be implemented in conjunction with plug-in modules, dynamic link libraries ("DLLs"), that will each support a different snapshot program such as .NET, TimeFinder, EVM, etc.

Figure 6:
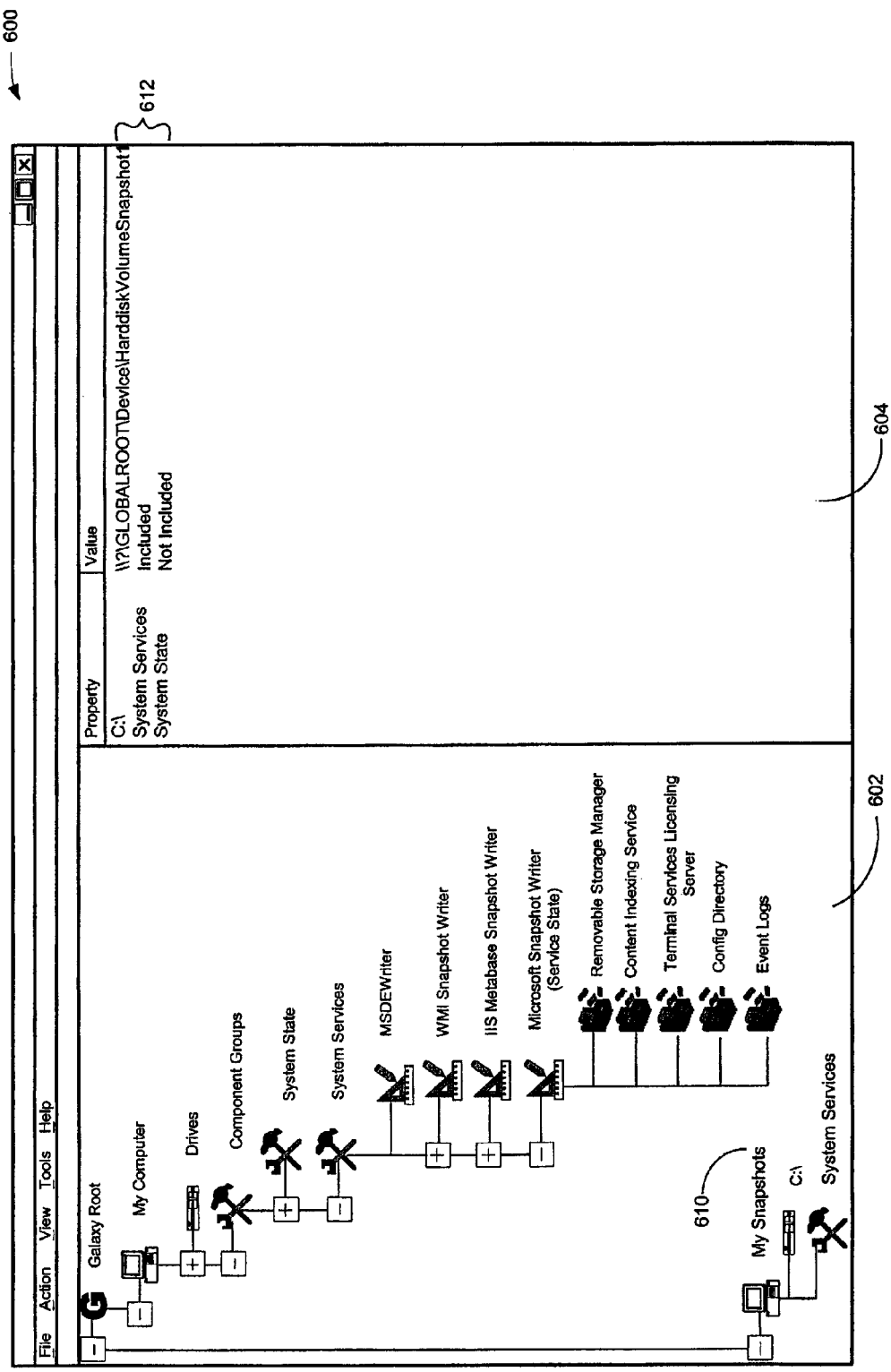
FIGS. 6 and 7 are browser style user interface screens according to an embodiment of the invention.

One embodiment of the present invention provides a user interface screen for users to browse and recover data, such as from snapshot images, quick recovery volumes, primary copies, backup copies, etc., as of a point-in-time. Browsing and recovery may be client, sub-client, volume, and application specific, and may be at the volume level or at the sub-volume level. Volume level recovery refers to replication of entire volumes, whereas sub-volume level refers to recovery at a folder, file, or object level. Referring to FIG. 6, a browser interface screen 600, according to one embodiment of this invention, includes a plurality of frames, such as directory frame 602 and a contents frame 604. The directory frame generally provides a list of all available drives, partitions, volumes, snapshots, backups, etc. and the file folders therein, of a client computer in a hierarchical arrangement. The contents frame 604 generally lists the contents of any item appearing in the directory frame 602, such as folders, files, or objects. The contents may be displayed by highlighting any one of the items in the directory frame 602. By selecting the "My Snapshots" folder, for example, the contents of the snapshots folder 612 are displayed in the contents frame 604. The contents may be displayed with relevant details, such as the date of creation, persistence, association, the capacity of the volume, etc. In one embodiment, the user may change the properties of a snapshot, such as how long a particular snapshot will persist, the location, etc., and the user may direct the creation of another volume or copy of a software snapshot using, for example, CommVault data movers.

In one embodiment, users may specify a point-in-time for which browsing and restoration may occur. In that instance, the browser application determines if there are any existing snapshot images present as of the point-in-time specified. Snapshot data found to be available as of the point-in-time the user specified is displayed to the user. Snapshot data is displayed if it exists and qualifies as valid data as of the point-in-time. If the browser application does not find a snapshot, backup copies, such as primary copies, and secondary copies, and quick recovery volumes are presented or accessed for data recovery or restoration. If the user chooses to drill down a given snapshot image, quick recovery volume, or backup copy to see the contents therein, such as by selecting or double-clicking an item, the item is displayed at the requesting client computer in an appropriate user interface screen, such as in an interface screen provided by the application associated with the item. Association generally refers to the relationship between a file and the application that created it.

The snapshot folder and contents displayed at the user interface as of a certain point-in-time may be provided by browse logic that will check the snapshot table to see if there is a snapshot available as of that point-in-time for volumes or copies of interest. If there is a snapshot available, data relating to the content of the snapshot is displayed accordingly. Application specific objects are mapped to data files or directories and this mapping is stored in database tables. This allows for an application-specific view of objects on the snapshot when the snapshot is browsed or recovered. For example, where a snapshot of C:\ volume has been created, browsing under heading "My Snapshots" may reveal a C:\ volume that is a snapshot image of the C:\ volume. Alternatively, snapshot images may be designated with different labels. For example, the snapshot volume of C:\ may be V:\. with a label indicating that V:\ is a snapshot volume of C:\. Drilling down through the snapshot and the folders therein may reveal the file, folders, or objects, which may be viewed, recovered, restored, deleted, etc. For example, a file "important.doc" appearing in the snapshot of the C:\ volume may be viewed with a document viewer, deleted, recovered, or restored to the primary volume.

Figure 7:
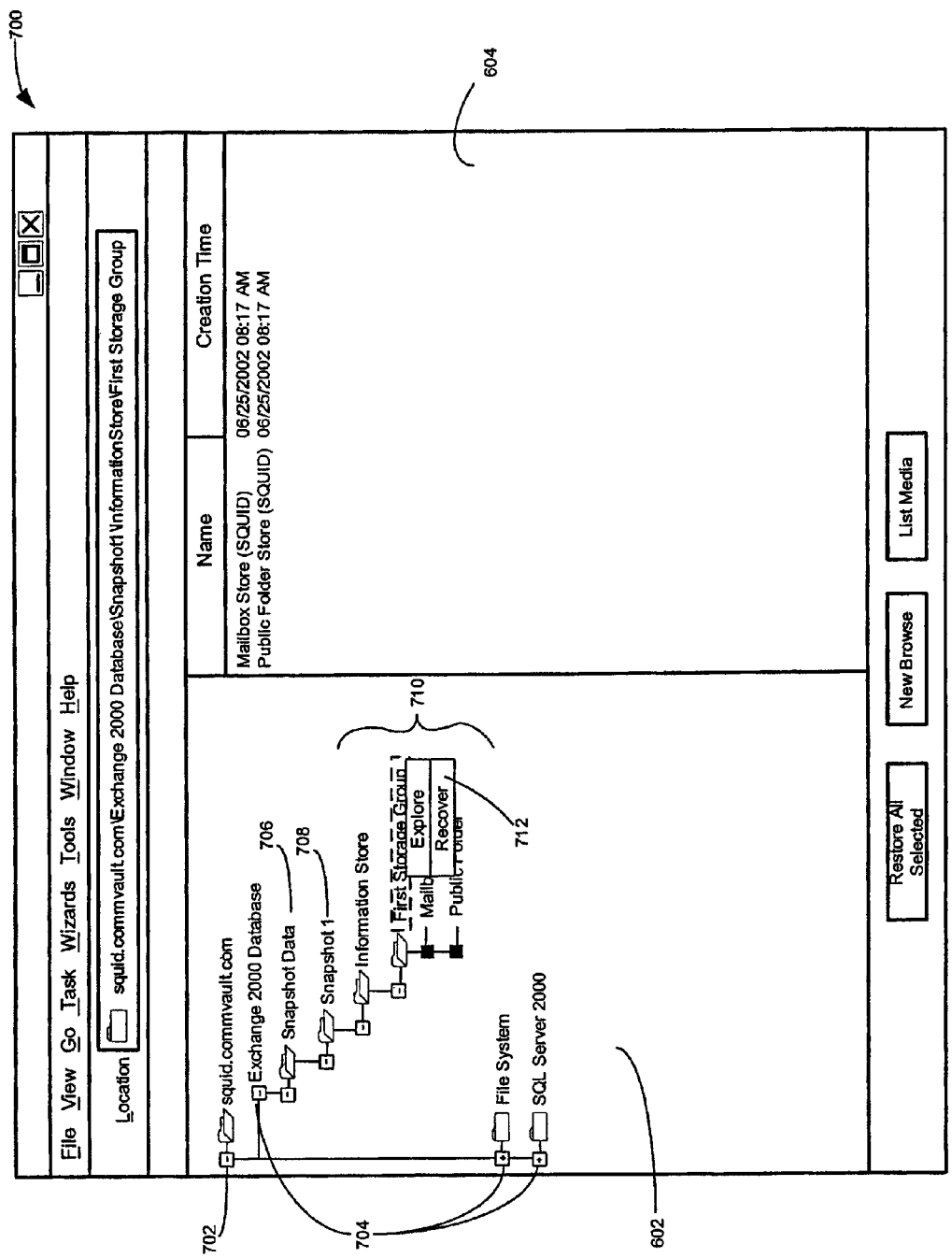

Referring to FIG. 7, a browser interface screen for browsing snapshot images according to an embodiment of the present invention displays a particular client 702 as a folder, for example, a folder for the client squid.commvault.com. At least one subfolder may be displayed showing the application or applications available with respect to the client for creating backup copies, browsing, and recovery. For example, the "Exchange 2000 Database," the "File System," and "SQL Server 2000." Selecting one of the subfolders, such as "Exchange 2000 Database" reveals subfolders therein, such as a "SnapShot Data" subfolder 706, which provides snapshot data for the selected application. Further drilling down through the subfolders will cause to be displayed in a hierarchical layout the snapshots available, such as "SnapShot 1," application objects 710, such as the "Information Store," "First Storage Group", "Mailbox Store", "Public Folder Store", etc. A user may then perform a single click recovery or restore, or creation of a snapshot image or quick recovery volume of a primary volume or application data, or of any backup copy by selecting the level from which the data displayed there under will be backed up or recovered. For example, by selecting the "First Storage Group" and right clicking, the user will be presented with an activity window 712, which allows the user to select the "Recover" function. In this instance, by selecting "Recover" all data related to the objects appearing under the "First Storage Group" will be recovered. The user may choose to recover a single file, or a single object, such as a single Exchange store or SQL Server database. The restoration may be implemented with a fast data mover, such as CommVault's DataPipe™, described in detail in application Ser. No. 09/038,440, which will move data from disk to disk. Additionally a disk-to-disk server-less data mover can be implemented as well.

The user interface screen may be used to recover a data set, such as the primary volume or application data, from a given snapshot copy or quick recovery volume. If an entire data set is to be recovered, the snapshot image or quick recovery volume may be substituted for the original volume, such as with the recovery process described above. Recovery of items smaller than a volume can be accomplished by using traditional file copy techniques or with Windows Explorer, such as by copying and pasting the desired files or objects. Depending on the files or objects being recovered, the recovery process may involve identifying which writers were involved at the time of the snapshot and then engaging them to accomplish the restoration.

The user interface screen may also be used to request destruction of a given snapshot copy on a single item bases or automatically upon the lapse of the persistence period. Basic information for each snapshot copy destroyed, or otherwise, may be stored for purposes of tracking and display. This information, in one embodiment, is stored in an MSDE database, but can also be stored in other similar data structures.

Some of the embodiments of the present invention leverage existing features of the CommVault Galaxy backup system. It will be recognized by those skilled in the art, however, that the embodiments of the present invention may be applied independently of the Galaxy system. While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

We claim:

1. A computer-implementable method, comprising:
providing a graphical user interface to receive inputs from users; and
providing a snapshot manager that interfaces with a backup storage system and that is displayed by the graphical user interface,
wherein the snapshot manager—
enables users to browse snapshot images and
enables users to recover snapshot images stored in the backup storage system,
wherein the snapshot manager interfaces with a volume snapshot service for creating a snapshot image, and
wherein the snapshot image is an exact image of an original volume.

2. The computer-implementable method of claim 1, further comprising providing a snapshot requester program module that packages data for the snapshot image, wherein the packaged data is configured to communicate to the volume snapshot service for creating the snapshot image.

3. The computer-implementable method of claim 1, further comprising providing a snapshot requester program module, and a snapshot writer program module directed by the snapshot requester program module to package data for the snapshot image, wherein the writer program module is configured to package data for a specific application, and wherein the packaged data is configured to communicate to the volume snapshot service for creating the snapshot image.

4. The computer-implementable method of claim 1, wherein the snapshot manager indexes snapshot images, wherein the snapshot indexing enables at least one of copying, deleting, displaying, browsing, changing properties, and recovering snapshot images.

5. The computer-implementable method of claim 4, wherein the indexing comprises indexing in terms of objects native to particular applications.

6. A system, comprising:
at least one processor;
memory having instructions and coupled to the at least one processor,
wherein, when executed by the at least one processor, the instructions generate a graphical user interface to receive inputs from users; and
a snapshot manager that interfaces with a backup storage system and that is displayed by the graphical user interface,
wherein the snapshot manager is configured to enable users to browse snapshot images and to enable users to recover snapshot images stored in the backup storage system,
wherein the snapshot manager interfaces with a volume snapshot service for creating a snapshot image, and
wherein the snapshot image is an exact image of an original volume.

7. The system of claim 6, further comprising a snapshot requester program module that packages data for the snapshot image, wherein the packaged data is configured to communicate to the volume snapshot service for creating the snapshot image.

8. The system of claim 6, further comprising a snapshot requester, and a snapshot writer directed by the snapshot requester to package data for the snapshot image, wherein the writer program module is configured to package data for a specific application, wherein the packaged data is communicated to the volume snapshot service for creating the snapshot image.

9. The system of claim 6, wherein the snapshot manager indexes snapshot images, snapshot indexing enabling at least one of copying, deleting, displaying, browsing, changing properties, and recovering snapshot images.

10. The system of claim 9, wherein the indexing comprises indexing in terms of objects native to particular applications.

11. A computer system comprising:
an archival storage unit; and
a programmed computer, coupled to the archival storage unit, wherein the programmed computer is configured to control data transfer from the programmed computer to the archival storage unit to create a quick recovery volume of a primary data set,
wherein the programmed computer is configured to—
provide a snapshot image of the primary data set, and
creating the quick recovery volume of the primary data set from the snapshot image for the primary data set, and
wherein the programmed computer interfaces with a volume snapshot service for creating a snapshot image, and
wherein the snapshot image is an exact image of an original volume.

12. The computer system of claim 11, the archival storage unit connected to the programmed computer over a communication network.

13. The computer system of claim 12, comprising at least one server computer communicatively coupled to the programmed computer and archival storage unit and programmed for controlling data transfer from the computer to the archival storage unit.

14. A method for creating a quick recovery volume of a primary data set of a first computer, the method comprising:
creating a snapshot image of the primary data set,
wherein the creating of the snapshot image includes interfacing with a volume snapshot service for creating the snapshot image, and
wherein the snapshot image is an exact image of an original volume; and
creating the quick recovery volume of the primary data set from the snapshot image of the primary data set.

15. The method of claim 14, further comprising creating the quick recovery volume of the primary data set as a disk-to-disk data-block-level replication of the primary data set.

16. The method of claim 14, further comprising creating the quick recovery volume of the primary data set as an incremental backup of a previous quick recovery volume of the primary data set.

17. The method of claim 14, further comprising synchronizing with an operating system to flush all data of the primary data set to an archival storage unit during the creation of the snapshot image of the primary data set.

18. The method of claim 14, further comprising performing a block-level copy of the primary data set from the snapshot image of the primary data set.

19. The method of claim 14, further comprising indexing the snapshot image of the primary data set.

20. The method of claim 14, further comprising deleting the snapshot image of the primary data set at a selected time, wherein the selected time comprises one of immediately after a copy phase and after a persistence period.

* * * * *

UNITED STATES PATENT AND TRADEMARK OFFICE
CERTIFICATE OF CORRECTION

PATENT NO. : 8,442,944 B2
APPLICATION NO. : 13/250763
DATED : May 14, 2013
INVENTOR(S) : Anand Prahlad et al.

It is certified that error appears in the above-identified patent and that said Letters Patent is hereby corrected as shown below:

In the Drawings:
On sheet 4 of 7, in Figure 4, Box 412, line 1, delete "COMAND" and insert -- COMMAND --, therefor.

In the Specification:
In column 7, line 13, delete "pervious" and insert -- previous --, therefor.
In column 7, line 19, delete "date" and insert -- data --, therefor.
In column 7, line 54, delete "even" and insert -- or even --, therefor.
In column 8, line 6, delete "stand alone" and insert -- stand-alone --, therefor.
In column 10, line 18, delete "volumes for." and insert -- volumes. --, therefor.
In column 12, line 2, delete "that" and insert -- than --, therefor.
In column 12, line 62, delete "updated" and insert -- updates --, therefor.
In column 12, line 63, delete "snap" and insert -- snapshot --, therefor.
In column 12, line 64, delete "snap," and insert -- snapshot, --, therefor.
In column 13, line 5, delete "operation. In" and insert -- operation, in --, therefor.
In column 14, line 18, delete "V:\." and insert -- V:\ --, therefor.
In column 15, line 5, delete "bases" and insert -- basis --, therefor.

In the Claims:
In column 16, line 47, in claim 12, delete "the" and insert -- wherein the --, therefor.

Signed and Sealed this
Twenty-fourth Day of September, 2013

Teresa Stanek Rea
*Deputy Director of the United States Patent and Trademark Office*